United States Patent [19]

McGovern et al.

[11] Patent Number: 4,498,767
[45] Date of Patent: Feb. 12, 1985

[54] APPARATUS FOR MEASURING LIGHT

[75] Inventors: William E. McGovern, Hanover Park; Kuey Y. Tsao, Barrington, both of Ill.

[73] Assignee: Teletype Corporation, Skokie, Ill.

[21] Appl. No.: 415,492

[22] Filed: Sep. 7, 1982

[51] Int. Cl.³ .................................................. G01J 1/06
[52] U.S. Cl. ................................. 356/121; 250/237 R; 250/578
[58] Field of Search ............................ 356/121, 153; 250/203 R, 203 S, 237 R, 237 G, 578

[56] References Cited

U.S. PATENT DOCUMENTS 2,439,295  4/1948  Hammond et al. ............. 250/237 R
3,435,246  3/1969  Webb ................................ 356/121

Primary Examiner—F. L. Evans
Attorney, Agent, or Firm—W. K. Serp

[57] ABSTRACT

A light sensor 10 includes two parallel, spaced mask plates 12, 14. A first mask plate 12 has nine, small, spaced holes 38a–i which are in alignment with corresponding holes 36a–i in the second mask plate 14. The light sensor 10 includes a base plate 18 having nine holes 22a–i into which photosensitive devices 26a–i are positioned and the base plate 18 is secured to the outer surface of the second mask plate 14. The photodiodes 26a–i are connected to an indicating means 32 which provides an indication of the light falling upon each photodiode 26a–i individually or upon all of the photodiodes 26a–i collectively.

11 Claims, 4 Drawing Figures

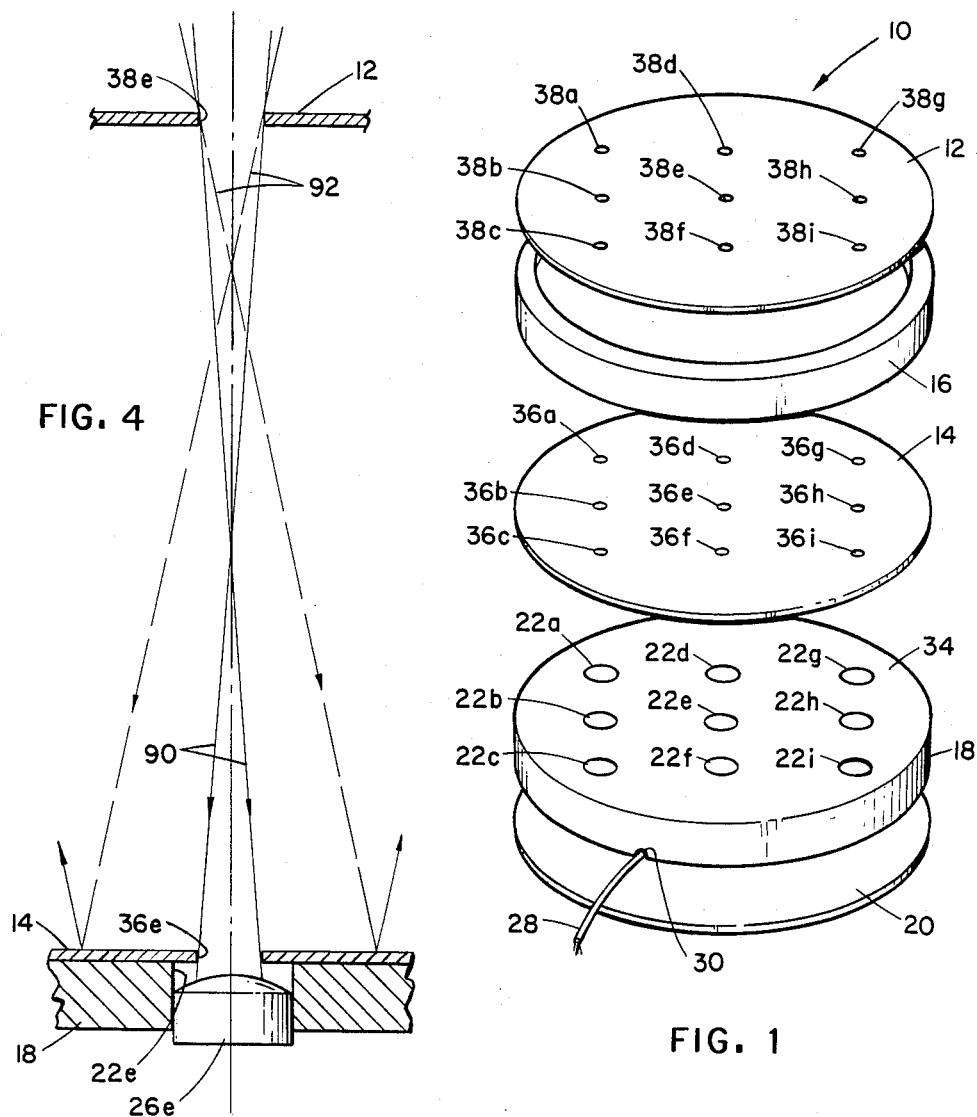
FIG. 4
FIG. 1
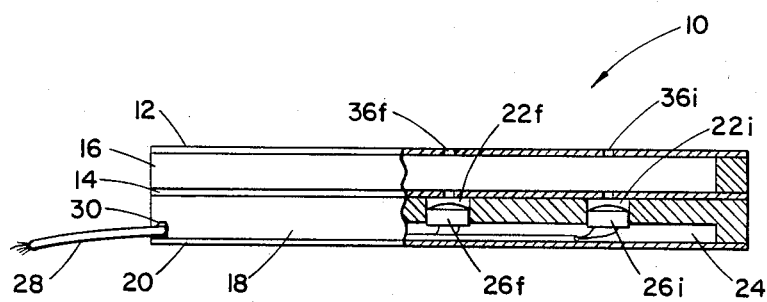
FIG. 2

APPARATUS FOR MEASURING LIGHT

DESCRIPTION

1. Technical Field

This invention relates to an apparatus for measuring the collimation and perpendicularity of light, from a light source, to a plane.

2. Background Art

Controlled light sources are widely used in industrial photolithography. One particular industrial activity where such light sources are used is in the manufacture of semiconductor circuitry. During the manufacture of semiconductor devices, a silicon wafer is coated with a conductive or nonconductive material which is thereafter coated with a light sensitive resist. A mask is placed over the resist, and the wafer is exposed to a light source. The unmasked areas of the resist, which are exposed to the light, undergo a chemical change. The non-exposed areas of the resist are removed and the undesired material is etched from the surface of the wafer. This process is repeated until a desired, layered structure is placed upon the silicon wafer. Extremely high dimensional tolerances are required during the fabrication of such semiconductor devices to obtain high circuit density. In order to attain high circuit density, the resist coating must be uniformly exposed by the light source.

commercially available light sources are provided with adjustments which are varied to obtain the desired intensity, collimation and perpendicularity of the light falling upon the surface of the wafer. The adjustment of the light source is particularly critical and is usually determined by exposing successive test wafers under varying light adjustment settings and thereafter selecting the particular adjustment settings which produce the desired result. The herein described apparatus effectively responds to the light from a light source providing a visual indication of the relative degree of collimation and perpendicularity of the light to a plane upon which a wafer will be supported. Adjustments may be conveniently made to the light source while continuously observing a visual indicator thus greatly reducing the time expended in making the necessary adjustments and obviating the need to process test wafers.

DISCLOSURE OF THE INVENTION

In accordnce with this invention, an apparatus is provided for measuring the collimation and perpendicularity of light provided by a light source to a plane. The apparatus includes a pair of parallel, spaced, opaque first and second mask plates. Each mask plate has a facing surface and an outwardly disposed surface with the facing surface of the first mask plate positioned opposite the facing surface of the second mask plate. Each of the first and second mask plates has a plurality of spaced, small holes with the holes of the first plate being in alignment with corresponding holes in the second mask plate. A plurality of photosensitive devices are included with each photosensitive device being positioned adjacent one of the holes of the second mask plate and adjacent the outwardly disposed surface thereof. Thus, light passing through the holes of the first mask plate, which is substantially perpendicular to the plane of the first mask plate, passes through the corresponding aligned holes of the second mask plate striking the corresponding photosensitive device. Additionally, means are included for providing an indication of the signal output of selected photosensitive devices.

Preferably, a spacing member defining a closed area is positioned between the first and second mask plates. The spacing member serves to maintain the respective holes in the first and second mask plates in alignment. The spacing member is located with respect to the first and second mask plates so that the holes in the first and second mask plates lie within the closed area defined by the spacing member.

Additionally, a base plate is provided having a plurality of spaced holes in alignment with the holes in the second mask plate. Each of the base plate holes are shaped to receive one of the photosensitive devices. The base plate maintains the photosensitive device in alignment with the holes in the second mask plate.

THE DRAWINGS

FIG. 1 is an exploded perspective view of a light sensor in accordance with this invention;

FIG. 2 is a partial sectional, end view of the light sensor of FIG. 1;

FIG. 4 is a diagram of selected light paths through the light sensor of FIG. 1.

DETAILED DESCRIPTION

Light Sensor

Figure 3:
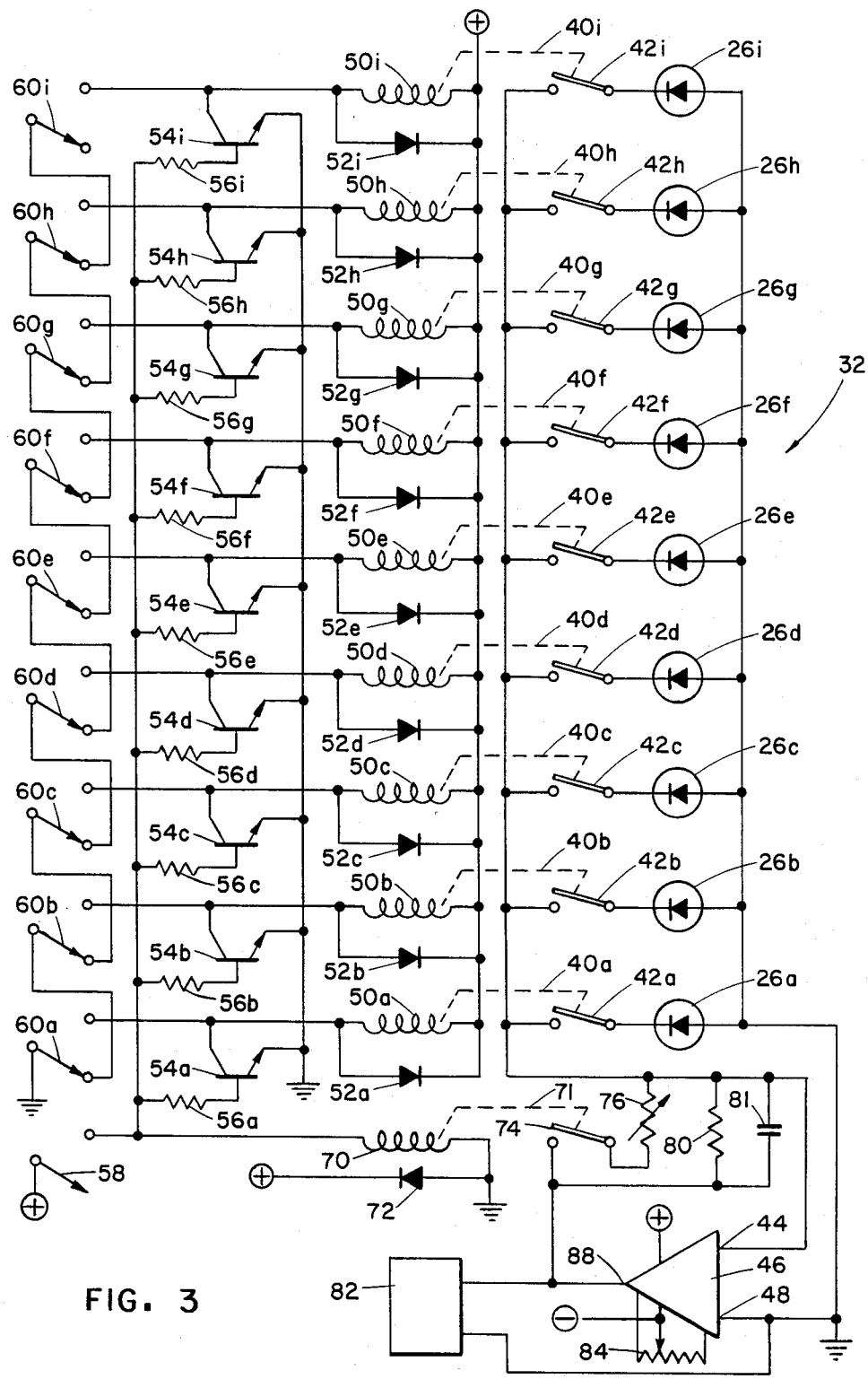
FIG. 3 is a schematic diagram of an indicating means for use with the light sensor of FIG. 1.

A light sensor 10 is illustrated in FIGS. 1 and 2 and is in the form of a short cylinder or disk. The light sensor 10 includes round, first and second mask plates 12, 14, a spacing member in the form of a ring 16, a base plate 18 and a bottom plate 20. The base plate 18 is a relatively thick cylindrical section having nine spaced holes 22$a$–$i$ and a cavity 24. Positioned within each of the nine base plates holes 22$a$–$i$ are respective photosensitive devices 26$a$–$i$ in the form of photovoltaic cells each generating an electrical current in response to light falling upon its photosensitive surfaces. A cavity 24, in the lower surface of the base plate 18, provides a routing space for connecting wires 28 from the cells 26$a$–$i$ which pass through a hole 30 in the wall of the base plate 18 for connection to an indicating means 32 illustrated in FIG. 3. The bottom plate 20 is secured to the lower surface of the base plate 18 closing the base plate cavity 24 and protecting the wires 28 and photosensitive devices 26$a$–$i$ from physical damage.

Positioned upon the upper surface 34 of the base plate 18 is the second mask plate 14 which has nine, small, spaced holes 36$a$–$i$. The holes 36$a$–$i$ are located upon the second mask plate 14 so that when the second mask plate 14 and bottom plate 18 are positioned as shown, each opening 36$a$–$i$ in the second mask plate 14 is centered over a corresponding one of the photosensitive devices 26$a$–$i$ thus restricting the amount of light falling upon the surface of the corresponding photosensitive device. Positioned upon and secured to the facing surface of the second mask plate 14 is the spacing ring 16. The ring 16 spaces the second mask plate 14 from the first mask plate 12 and maintains the two mask plates 12, 14 in precise parallel alignment. The first mask plate 12 also has nine, small, spaced holes 38$a$–$i$ which correspond to the nine holes 36$a$–$i$ in the second mask plate 14. The facing surfaces of the mask plates 12 and 14, as well as the inner wall of the ring 16, are preferably coated with a light absorbing material to reduce light reflections between the mask plates 12, 14. To assure registration of the holes 38a-i in the first mask plate 12 with the holes 36a-i in the second mask plate 14, it is preferred that, during construction, the two mask plates 12, 14 be clamped together and that corresponding holes 38a-i, 36a-i be simultaneously drilled in the two mask plates 12, 14. The first and second mask plates 12, 14 are preferably secured to the spacing ring 16 during assembly by an adhesive applied to the mating surfaces. While the adhesive is setting, the relative positions of the mask plates 12, 14 are adjusted to that position which allows maximum light to pass through aligned holes 36a-i, 38a-i into the corresponding photosensitive device 26a-i. Once this position is attained, the plates 12, 14, 18 are held in relative position until secured by the adhesive. Thus, a unitary assembly is obtained with each hole 38a-i in the first mask plate 12 aligned with a corresponding hole 36a-i in the second mask 14 which is in line with a photosensitive device 26a-i in the base plate 18.

Indicating Means

The indicating means 32 of FIG. 3 provides a visual indication of the amount of light falling upon a selected photosensitive device or the total light falling upon all of the photosensitive devices 26a-i. The cathodes of all of the photosensitive devices 26a-i are connected together and connected to the system ground potential. The anode of each photosensitive device 26a-i is connected to one terminal of an associated single pole, single throw relay 40a-i contact 42a-i. The remaining terminal of the contact 42a-i of each of the relays 40a-i is commonly connected to one input 44 of a linear, differential operational amplifier 46. A remaining input terminal 48 of the amplifier 46 is connected to system ground. Thus, upon closure of one or all of the relay contacts 40a-i, the current generated by the photosensitive device 26a-i connected to that relay 40a-i is applied to the input 44 of the operational amplifier 46.

The relays 40a-i include relay coil 50a-i for controlling the relay contacts 42a-i and a shunt diode 52a-i is connected across each coil 50a-i to reduce inductive voltages which may be generated by interrupting the current through relay coils 50a-i. One terminal of each coil 50a-i is connected to the positive supply source (not shown). The remaining terminal of each coil 50a-i is connected to the collector of an associated NPN control transistor 54a-i the emitter of which is connected to a common supply potential. Each transistor 54a-i serves to selectively provide a current path for the associated relay coil 50a-i in response to a positive voltage applied to the base of the associated transistor 54a-i through a current limiting resistor 56a-i. The current limiting resistors 56a-i are commonly connected to one terminal of a single pole, single throw switch 58. The remaining terminal of the switch 58 is connected to the positive terminal of the supply source. The collector of each of the relay control transistors 54a-i is connected to one terminal of an associated single pole, single throw switch 60a-i. The wiper of each switch 60a-i is connected to the remaining pole of the adjacent switch and the wiper of the leftmost switch 60a is connected to the system ground. It will be appreciated that the wiring configuration of the switches 60a-i allows only one relay 40a-i to be energized at a time. The energized relay 40a-i connects the associated photosensitive device 26a-i to the input 44 of the differential amplifier 46.

A fized contact of the switch 58 is also connected to one terminal of a relay coil 70 forming part of a relay 71. The remaining terminal of the coil 70 is connected to system ground. A diode 72 is connected between the coil 70 and the positive supply terminal and serves to reduce induced voltages generated by interrupting the coil 70 current and thus prevent such voltages from damaging other circuit components. The relay coil 70 controls a single pole, single throw contact 74 which connects an adjustable resistor 76 between the input 44 and the output 78 of the amplifier 46 thereby reducing the amplifier gain. Additionally, a second biasing resistor 80 and parallel capacitor 81 are connected between the input and output terminals of the amplifier 46 and determine the gain and bandwidth of the amplifier 46 in accordance with conventional practice. The output 78 of the amplifier 46 feeds a digital volt meter 82 which provides an indication proportional to the voltage at the input 44 of the amplifier 46. The offset of the amplifier 46 is set by an adjustable resistor 84. The value of the resistor 80 is selected to provide the desired meter 82 indication with the switch 58 open and with one of the switches 60a-i closed. Closure of one of the switches 60a-i connects the output of a single photosensitive device 60 to the input of the amplifier 46 and the meter 82 provides an indication of the amount of light falling upon the selected photosensitive device 26a-i. In response to closure of the switch 58, all of the transistors 54a-i are turned on and all of the photosensitive devices 26a-i are parallel connected by the relays 40a-i to the input 44 of the amplifier 46. Also, the relay 71 is energized and the contacts 74 close reducing the gain of the amplifier 46. With the switch 58 closed, the resistor 76 is adjusted to obtain the desired meter 82 indication with all photodiodes connected to the amplifier 46.

Operation

In use, the light sensor 10 is placed upon a surface (not shown) at the location whereat illimination is to be measured. The amount of light passing through a pair of aligned holes 36a-i, 38a-i is individually measured by closing the associated one of the switches 60a-i and the entire amount of light falling upon all of the photosensitive devices is measured by closing the switch 58. FIG. 4 illustrates the light path through two representative aligned holes 38e, 36e in the first and second mask plates 12, 14. Light rays 90 which are substantially perpendicular to the upper surface of the first plate 12 and which pass through the hole 38e will pass through the corresponding hole 36e in the second mask plate 14 and strike the surface of the photosensitive device 26e. Light rays 92, which are oblique to the first mask plate 12 and which also pass through the hole 36e in the first mask plate 12, will strike the facing surface of the second mask plate 14 rather than pass through the corresponding hole 38e in the second mask plate 14 as illustrated. As previously mentioned, the coating on the facing surfaces mask plates 12, 14 absorbs light greatly reducing the intensity of light reflections between the mask plates 12 and 14. It will be appreciated that the spacing between the first and second mask plates 12, 14 in relation to the size of the holes 38, 36 is determinative of the amount the path of a light ray may deviate from a perpendicular to the plane of the mask plate 12 and still pass through aligned openings 38a-i, 36a-i in the mask plates 12, 14. Such a deviation may be adjusted within acceptable tolerances varying the hole 36a-i, 38a-i size and mask plate 12, 14 spacing. In a particular embodiment having holes 38a-i, 36a-i with diameters of approximately 10 thousandths of an inch and with a spacing between outwardly disposed surfaces of the first and second mask plates 12, 14 of 0.40 inches, light rays which were within 1.43° (degrees) of normal to the surface of the first mask plate 12 passed through both aligned holes.

Commercially available light sources (not shown) are provided with adjustments which are varied to change the intensity, collimation, and direction (perpendicularity) of the light being generated. As mentioned, the light sensor 10 is placed upon a surface at the location whereat illumination is to be measured. The light source collimation and direction (perpendicularity) adjustments (not shown) are varied while viewing the meter 82 until a maximum indication is attained. Thus, the light source is adjusted without the necessity of exposing and processing a series of test wafers.

Although this invention has been particularly shown and described with reference to a preferred embodiment thereof, it will be understood that various changes in form and detail may be made without departing from the scope and spirit of the invention as defined by the following claims.

What is claimed is:

1. An apparatus for measuring the collimation and perpendicularity of light, provided by an adjustable light source, to a plane comprising:
   a pair of parallel, spaced, opaque first and second mask plates (12, 14) each having facing and outwardly disposed surfaces with the facing surface of said first mask plate (12) positioned opposite the facing surface of said second mask plate (14);
   each of said first and second mask plates (12, 14) having a plurality of spaced, small holes (38a-i, 36a-i), a plurality of said holes (38a-i) in said first mask plate (12) being in alignment with corresponding holes (36a-i) in said second mask plate (14);
   a plurality of photosensitive devices (26a-i) generating an electrical signal in response to light, each one of said photosensitive devices (26a-i) being positioned adjacent one of said holes in said second mask plate so that light passing through the holes (38a-i) of said first mask plate (12) which is substantially perpendicular to the plane of said first mask plate (12) will pass through the corresponding aligned holes (36a-i) of said second mask plate (14) striking the corresponding photosensitive devices (26a-i); and
   means (32) for providing an indication of the electrical signal from selected ones of said photosensitive devices (26a-i).

2. The apparatus of claim 1 which further includes:
   a spacing member (16) defining a closed area, said spacing member (16) being positioned between siad first and second mask plates (12, 14), said spacing member (16) serving to maintain the respective holes (38a-i, 36a-i) in said first and second mask plates (12, 14) in alignment and said spacing member (16) being located with respect to said first and second mask plates (12, 14) so that said holes (38a-i, 36a-i) in said first and second mask plates (12, 14) lie within the closed area defined by said spacing member (16).

3. The apparatus of claim 2 which further includes a base plate (18) having a plurality of spaced holes (22a-i), the holes (22a-i) in said base plate (18) being in alignment with the holes (36a-i) in said second mask plate (14), each of said base plate holes (22a-i) being shaped to receive one of said photosensitive devices (26a-i) and each serving to maintain said photosensitive devices (26a-i) in alignment with said holes (36a-i) in said second mask plate (14), the upper surface of said base plate (18) being adjacent the outer surface of said second mask plate (14).

4. The apparatus of claim 3 wherein said first and second mask plates (12, 14) are circular in shape and said spacing member (18) is in the form of a ring (16) having an outer diameter substantially the same dimension as the diameter of said first and second mask plates (12, 14).

5. The apparatus of claim 4 wherein the facing surfaces of said first and second mask plates (12, 14) and the inner wall of said spacing ring (16) are coated with a light absorbing material.

6. The apparatus of claim 5 wherein the lower surface of said base plate (18) has a cavity (24) and an opening (30) through the wall of said base plate (18) in communication with the recess (24) to provide a convenient passage for interconnect wiring (28) and a bottom plate (20) secured to the lower surface of said base plate (18), said bottom plate (20) and said first and second mask plates (12, 14) lying in substantially parallel planes.

7. The apparatus of claim 4 wherein the lower surface of said base plate (18) defines a recess (24) and an opening (30) through the wall of said base plate (18) in communication with said recess (24) to provide a convenient passage for interconnect wiring (28) and a bottom plate (20) secured to the lower surface of said base plate (18), said bottom plate (18) and said first and second mask plates (12, 14) lying in substantially parallel planes.

8. The apparatus of claim 1 wherein said indicating means (32) includes:
   an indicator (46, 82);
   a first switching means (60a-i, 40a-i) for selectively connecting one of said photosensitive devices (26a-i) to said indicator (46, 82); and
   a second switching means (58, 54a-i) for simultaneously connecting all of said photosensitive devices (26a-i) to said indicator (46, 82).

9. The apparatus of claim 8 wherein said indicator (46, 82) includes an amplifier (46) amplifying the signals from said photosensitive devices (26a-i) and driving a meter (82) and means (76) for varying the gain of said amplifier (46) in response to the position of said second switching means (58, 54a-i).

10. The apparatus of claim 7 wherein said indicating means (32) includes:
    an indicator (46, 82);
    a first switching means (60a-i 40a-i) for selectively connecting one of said photosensitive devices to said indicator (46, 82); and
    a second switching means (58, 54a-i) for simultaneously connecting all of said photosensitive devices (26a-i) to said indicator (46, 82).

11. The apparatus of claim 10 wherein said indicator (46, 82) includes:
    an amplifier (46) responsive to the electrical signals from said photosensitive devices (26a-i);
    a meter (82) driven by said amplifier (46); and
    means (71, 76) for varying the gain of said amplifier (46) in response to the position of said second switching means (58, 54a-i).

* * * * *